PULSE CONVERTER FOR BINARY SIGNALS OF RECTANGULAR SHAPE TO PULSES HAVING FOUR LEVELS OR STEPS

Filed April 30, 1963 2 Sheets-Sheet 1

INVENTOR
JOACHIM ENGEL
BY Philip M. Bolton
ATTORNEY

INVENTOR
JOACHIM ENGEL

United States Patent Office 3,287,647
Patented Nov. 22, 1966

3,287,647

PULSE CONVERTER FOR BINARY SIGNALS OF RECTANGULAR SHAPE TO PULSES HAVING FOUR LEVELS OR STEPS

Joachim Engel, Hamburg-Rahlstedt, Germany, assignor to International Standard Electric Corporation, New York, N.Y., a corporation of Delaware Filed Apr. 30, 1963, Ser. No. 276,792
Claims priority, application Germany, May 24, 1962, St 19,281
13 Claims. (Cl. 328—34)

This invention relates to pulse converters and more particularly to a pulse converter to convert a sequence of rectangular pulses into a train of pulses that can be transmitted over a transmission path impervious to direct current voltage.

The converter of this invention will be described in connection with rectangular pulses conveying information by binary techniques. However, it is to be understood that this description is not a limitation on the utility of the invention, but merely an example thereof, since the circuit of this invention will convert any rectangular pulse into a pulse that can be transmitted on a transmission path impervious to direct current.

It is well known that a transmission path impervious to the passage of direct current (D.C.) voltage, such as a transmission path equipped with alternating current (A.C.) amplifiers and repeaters, behave exactly like a bandpass filter. If a rectangular pulse is applied to the input of such a transmission path, the leading edge of the pulse will become flattened and the trailing edge will have one or more over-oscillations at the output of the transmission path. The flattening of the leading edge will be greater and the amplitude of the over-oscillations will be larger with a reduction in the passband and the sharpening of the cut-off characteristic of the transmission line. When referring to sharper cut-off characteristic, reference is made to the steepness of the curve representing the transmission characteristic of a bandpass circuit. In order to avoid the flattening of the leading edge and the over-oscillations, it has been proposed to flatten the edges of the rectangular signals generated, for instance, with the aid of lowpass filters before applying the signals to the transmission path. One telegraph technique is also known in which the amplitudes of binary signals for the purpose of distinguishing several channels have the appearance of a staircase.

Another known technique employed for transmitting binary information over transmission paths impervious to D.C. voltage requires expensive systems in which a carrier frequency is amplitude or frequency modulated by the binary signals to be transmitted.

The first above-mentioned method is not applicable to binary systems where it is desired to transmit the binary signals over a transmission path impervious to D.C. voltage because the additional flattening of the pulse edges reduces the transmission reliability.

Therefore, it is an object of this invention to provide an improved means for operating upon rectangular pulses for transmission over transmission paths impervious to D.C. voltage in which the pulses applied to the transmission path have rectangular edges.

Another object of this invention is to provide an arrangement enabling the transmission of binary signals over transmission paths impervious to D.C. voltage which does not require expensive components such as employed in the arrangement utilizing the modulation of a carrier frequency by the binary signals to be transmitted.

Still another object of this invention is to provide a converter to convert a sequence of rectangular pulses into a train of pulses that are capable of being transmitted over a transmission path impervious to D.C. voltage.

A feature of this invention is the provision of a monostable trigger circuit, a first means coupled to a source of rectangular pulses and the input of the trigger circuit responsive to both the leading and trailing edges of each of the rectangular pulses to control the triggering of the trigger circuit and a second means coupled to the source of rectangular pulses and the output of the trigger circuit to produce the train of pulses capable of being transmitted on a transmission path impervious to D.C. voltage wherein each pulse of the train of pulses includes a plurality of steps of predetermined different voltage values.

The above-mentioned and other features and objects of this invention will become more apparent by reference to the following description taken in conjunction with the accompanying drawings, in which.

Figure 1:
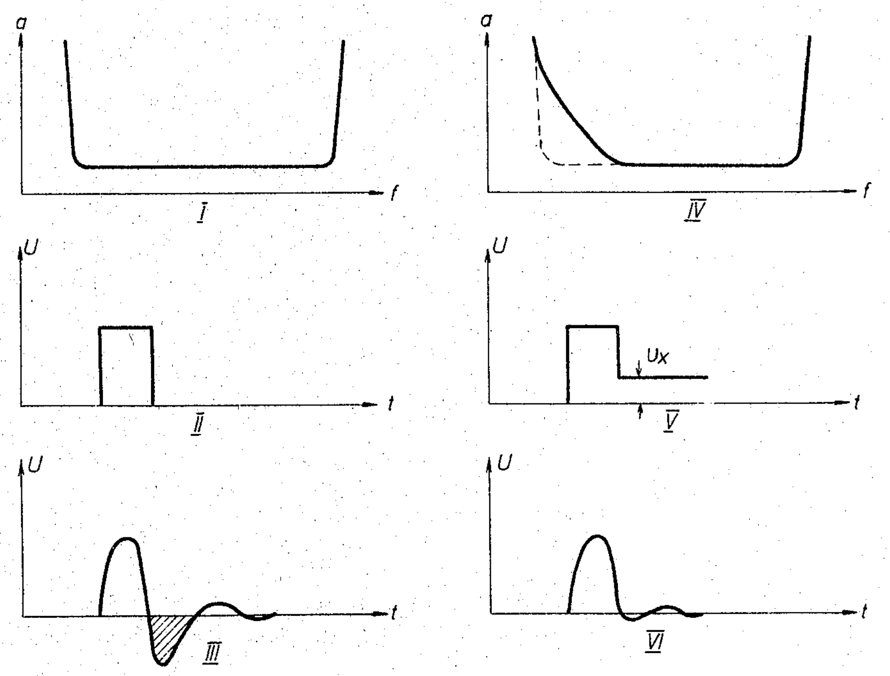
FIG. 1 illustrates a series of curves representing the shape of the passband characteristic of the transmission path impervious to D.C. voltage, the input pulse and the output pulse of such a transmission path to demonstrate the improvement of the arrangement of this invention as compared with applying the rectangular pulses directly to such a transmission path.

Referring to FIG. 1, curve I illustrates the selectivity curve of a transmission path impervious to D.C. voltage, curve II illustrates a rectangular pulse applied to the input of the transmission path and cure III illustrates the output pulse from the transmission path. As illustrated, the ascending edge or the leading edge of the output pulse is flattened, the amplitude is slightly reduced, and the descending edge or trailing edge displays a vigorous overswing or over-oscillation which is shaded in the drawing. In order to prevent this, a pulse is applied to the input of the transmission path in accordance with the principles of this invention as illustrated in curve V. This pulse as illustrated has a rectangular shape but the descending or trailing edge does not return to its original value but retains a certain finite value $U_x$. As illustrated in curve VI the output pulse from the transmission path when excited by the pulse of curve V displays only a slight amplitude of over-oscillation and, therefore, can no longer interfere with the utilization of the signal. The technique in accordance with the principles of this invention behaves somewhat like a frequency band clipper in the range of the lower cut-off frequency as illustrated by the solid line in curve IV.

Figure 2:
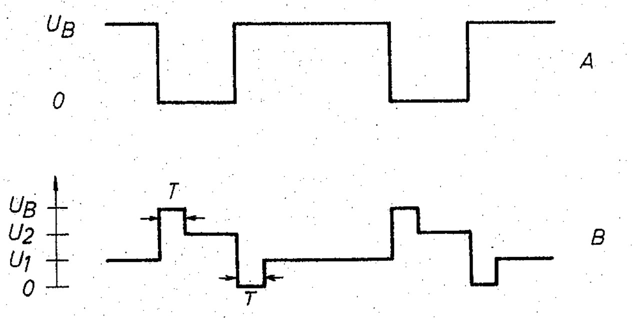
FIG. 2 illustrates two curves, one representing the binary signal to be transmitted and the other the pulse train formed by the converter of this invention.

Referring to FIG. 2, curve A illustrates rectangular pulses carrying information in the binary notation which are to be acted upon by the converter of this invention to provide the pulse train as illustrated in curve B for application to the input of the transmission path. Pulse width T and the steps of voltage values 0 to $U_B$ are chosen as determined by the properties of the transmission path. For instance, the greater the transient time the greater the value of pulse width T and the smaller the voltage difference between 0 to $U_1$ to $U_2$ . . . to $U_B$. If the behavior of the transmission path's transient time is known, the pulse train's shape can be calculated. However, this is not alway possible in practice, but the required shape can be provided at the transmitting end by means of an adjustment that demands no more of the operating personnel time than the familiar line current adjustment. Nor is there any reason to fear with the transmission paths now available that an adjustment might be made that would no longer allow a reliable transmission of the signals.

Figure 3:
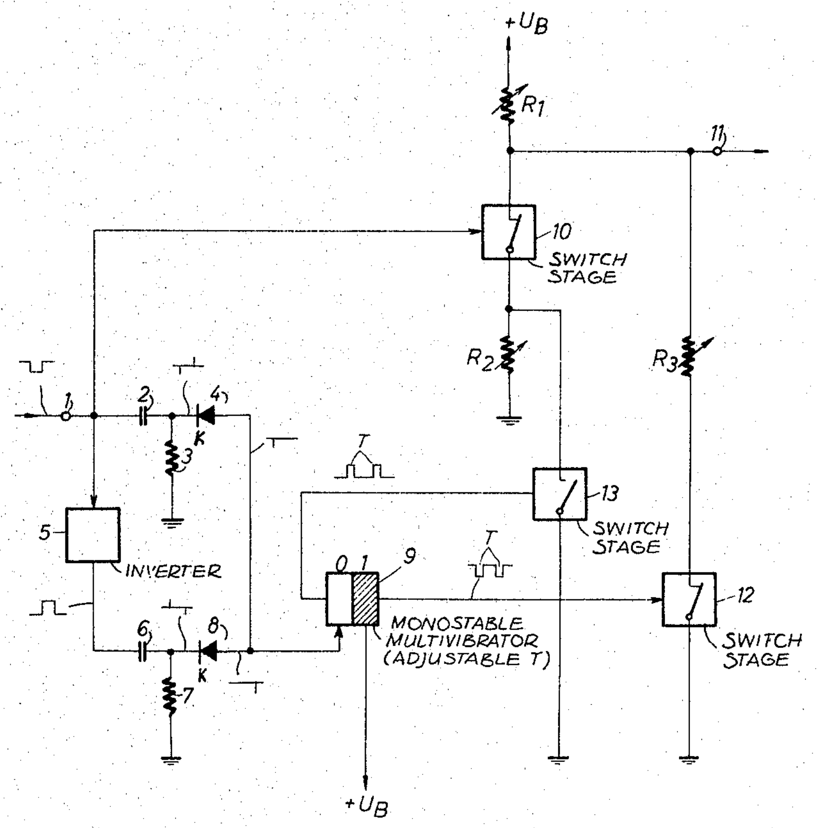
FIG. 3 is a schematic diagram in block form of the converter in accordance with the principles of this invention.

Referring to FIG. 3, there is illustrated a schematic diagram in block form of a converter according to the principles of this invention. The sequence of rectangular pulses as illustrated in curve A, FIG. 2 is applied to input terminal 1. From terminal 1 these rectangular pulses are coupled to a first circuit including a differentiator circuit composed of capacitor 2 and resistor 3, and a diode 4. At the same time these input rectangular pulses are coupled to a second circuit including inverter 5, a second differentiator composed of capacitor 6 and resistor 7, and a second diode 8. These two parallel circuits are coupled to the input of a monostable relaxation oscillator, such as a monostable multivibrator 9. The input rectangular pulses are also coupled to a normally conductive (closed) switch stage 10 to control the conduction condition thereof. One output of multivibrator 9, illustrated as the 0 output, is coupled to a second switch stage 13, normally nonconductive (open), to control the conduction condition thereof and the other output of multivibrator 9, the 1 output, is coupled a third switch stage 12, normally conductive (closed), to control the conduction condition thereof.

The operation of the circuit of FIG. 3 may be described as follows. When an input rectangular pulse has a value $U_B$ (curve A, FIG. 2), switch stages 10, 12, and 13 will be in their normal condition as illustrated in FIG. 3 and trigger stage 9 will have a high output from the 1 output and a low output from the 0 output. Under these conditions, the voltage at output terminal 11 will have a value determined by the ratio of resistances $R_1$, $R_2$, and $R_3$ according to the relationship $$\frac{\frac{R_2R_3}{R_2+R_3}}{\frac{R_2R_3}{R_2+R_3}+R_1}$$

Thus, the voltage $U_B$ applied to resistor $R_1$ (the operating voltage) is reduced to a value $U_1$ (curve B, FIG. 2) at terminal 11 by the resistance relationship set forth hereinabove.

If the input voltage at terminal 1 (curve A, FIG. 2) approaches zero, trigger circuit or multivibrator 9 will be triggered into its unstable condition by the pulse derived from the differentiator including capacitor 2 and resistor 3, and diode 4, resulting in a low output from the 1 output and a high output from the 0 output. This will cause switch stage 12 to become nonconductive (open) and switch stage 13 to become conductive (closed). Also, switch stage 10 will be rendered nonconductive (open) by the input at terminal 1 and, hence, current flow therethrough will be interrupted. This results in a value of voltage at terminal 11 equal to $U_B$.

After a time T (curve B, FIG. 2) as determined by the time constant of multivibrator 9, the multivibrator 9 will return to its initial stable condition. This results again in a high output at the 1 output and a low output at the 0 output of multivibrator 9. Thus, again switch stage 13 is rendered nonconductive (open) and switch stage 12 is rendered conductive (closed). Switch stage 10 will remain in the nonconductive (open) condition due to the input voltage still being at a value of zero. With this condition of the switch stages 10, 12, and 13, a voltage $U_2$ will appear at the output terminal 11 which corresponds to a distribution ratio of resistances $R_1$ and $R_3$ according to the relationship $$\frac{R_3}{R_1}+R_3$$

When the input voltage at terminal 1 again reaches the value $U_B$, multivibrator 9 will be triggered by a pulse representing the trailing edge of the rectangular pulse through the circuit including inverter 5, the differentiator composed of capacitor 6 and resistor 7, and the diode 8. Under this condition multivibrator 9 will be switched to its unstable condition and switch stage 10 will again be rendered conductive (closed). When multivibrator 9 assumes its unstable condition, switch stage 12 is rendered nonconductive (open) and switch stage 13 is rendered conductive (closed). With this condition of switch stages 10, 12, and 13, output terminal 11 is grounded through switch stage 10 and switch stage 13 and the output voltage is zero. After the passage of time T, multivibrator 9 will assume its stable condition and switch stages 10, 12, and 13 will assume the condition illustrated in FIG. 3 resulting in an output voltage at terminal 11 having a value $U_1$, as described hereinabove.

To provide the most favorable shape for the wave of curve B, FIG. 2, for the available transmission path, the time T of multivibrator 9 and resistors $R_1$, $R_2$, and $R_3$ are made adjustable to enable conforming the width T and the amplitude difference between the amplitude steps to the available transmission path.

While I have described above the principles of my invention in connection with specific apparatus, it is to be clearly understood that the description is made only by way of example and not as a limitation to the scope of my invention as set forth in the objects thereof and in the accompanying claims.

I claim:

1. A converter to convert a sequence of rectangular pulses into a train of pulses capable of being transmitted on a transmission path impervious to direct current voltage comprising:
   - a source of rectangular pulses;
   - a monostable trigger circuit;
   - means coupled to said source and the input of said trigger circuit responsive to each of the leading and trailing edges of each of said rectangular pulses to control the triggering of said trigger circuit;
   - first switching means coupled to said source responsive to said rectangular pulses; and
   - second switching means coupled to the output of said trigger circuit and said first switching means;
   - said first and second switching means cooperating to produce said train of pulses, each pulse thereof having four steps of predetermined different voltage values.

2. A converter according to claim 1, wherein said means triggers said trigger circuit from its stable state to its unstable state.

3. A converter according to claim 2, wherein the length of time said trigger circuit remains in said unstable state is adjusted to be directly related to the transient time of said transmission path and the amplitude difference between said steps is adjusted to be inversely related to said transient time.

4. A converter according to claim 1, wherein said rectangular pulses represent binary information.

5. A converter according to claim 1, wherein said means includes
   - a first circuit coupled to said source responsive to the leading edge of said rectangular pulses; and
   - a second circuit coupled to said source responsive to the trailing edge of said rectangular pulses.

6. A converter to convert a sequence of rectangular pulses into a train of pulses capable of being transmitted on a transmision path impervious to direct current voltage comprising:
   - a source of rectangular pulses;
   - a monostable trigger circuit;
   - first means coupled to said source and the input of said trigger circuit responsive to each of the leading and trailing edges of each of said rectangular pulses to control the triggering of said trigger circuit; and
   - second means coupled to said source and the output of said trigger circuit to produce said train of pulses, each pulses thereof having a plurality of steps of predetermined different voltage values;
   - said first means including
     - a first circuit coupled to said source responsive to the leading edge of said rectangular pulses, and
     - a second circuit coupled to said source responsive to the trailing edge of said rectangular pulses;

said first circuit including a first differentiator coupled to said source, and a first diode coupled to said first differentiator poled to pass the negative portion of the output signal from said first differentiator to said trigger circuit; and said second circuit including a phase inverter coupled to said source;

a second differentiator coupled to said inverter, and a second diode coupled to said second differentiator poled to pass the negative portion of the output signal from said second differentiator to said trigger circuit.

7. A converter to convert a sequence of rectangular pulses into a train of pulses capable of being transmitted on a transmission path impervious to direct current voltage comprising:

a source of rectangular pulses;

a monostable trigger circuit;

first means coupled to said source and the input of said trigger circuit responsive to each of the leading and trailing edges of each of said rectangular pulses to control the triggering of said trigger circuit, and second means coupled to said source and the output of said trigger circuit to produce said train of pulses, each pulse thereof having a plurality of steps of predetermined different voltage values;

said second means including three switch devices, one of said switch devices being controlled by said rectangular pulses and the other two of said switch devices being alternately controlled by said trigger circuit; and means coupled to said three switch devices and under control thereof to produce said train of pulses.

8. A converter to convert a sequence of rectangular pulses into a train of pulses capable of being transmitted on a transmission path impervious to direct current voltage comprising:

a source of rectangular pulses;

a monostable trigger circuit;

first means coupled to said source and the input of said trigger circuit responsive to each of the leading and trailing edges of each of said rectangular pulses to control the triggering of said trigger circuit; and second means coupled to said source and the output of said trigger circuit to produce said train of pulses, each pulse thereof having a plurality of steps of predetermined different voltage values;

said second means including a first normally conductive switch device having its conduction condition controllable by said rectangular pulses;

a source of operating potential;

a first resistor coupling said source of operating potential to said first switch device;

a second resistor coupling said first switch device to a reference potential;

an output terminal coupled to the junction between said first resistor and said first switch device;

a second normally nonconductive switch device having its conduction condition controlled by one output signal of said trigger circuit coupled intermediate said reference potential and the junction between said first switch device and said second resistor;

a third resistor coupled to the junction between said first resistor and said first switch device; and a third normally conductive switch device having its conduction condition controlled by the other output signal of said trigger circuit coupled between said third resistor and said reference potential.

9. A converter according to claim 8, wherein said trigger circuit is adjustable to render the length of time said trigger circuit is in its unstable condition directly proportioned to the transient time of said transmission path and said first, second and third resistors are adjustable to render the amplitude difference between said steps indirectly proportioned to said transient time.

10. A converter to convert a sequence of rectangular pulses into a train of pulses capable of being transmitted on a transmission path impervious to direct current voltage comprising:

a source of rectangular pulses;

a monostable trigger circuit;

first means coupled to said source and the input of said trigger circuit responsive to each of the leading and trailing edges of each of said rectangular pulses to control the triggering of said trigger circuit; and second means coupled to said source and the output of said trigger circuit to produce said train of pulses, each pulse thereof having a plurality of steps of predetermined different voltage values;

said first means including a first circuit coupled to said source responsive to the leading edge of said rectangular pulses, a second circuit coupled to said source responsive the trailing edge of said rectangular pulses;

said second means including three switch devices, one of said switch devices being controlled by said rectangular pulses and the other two of said switch devices being alternately controlled by said trigger circuit; and means coupled to said three switches and under control thereof to produce said train of pulses.

11. A converter to convert a sequence of rectangular pulses into a train of pulses capable of being transmitted on a transmission path impervious to direct current voltage comprising:

a source of rectangular pulses;

a monostable trigger circuit;

first means coupled to said source and the input of said trigger circuit responsive to each of the leading and trailing edges of each of said rectangular pulses to control the triggering of said trigger circuit; and second means coupled to said source and the output of said trigger circuit to produce said train of pulses, each pulse thereof having a plurality of steps of predetermined different voltage values;

said first means including a first circuit having a first differentiator coupled to said source, and a first diode coupled to said first differentiator poled to pas the nagative portion of the output signal from said lrst differentiator to said trigger circuit;

a second circuit having a phase inverter coupled to said source, a second differentiator coupled to said inverter, and a second diode coupled to said second differentiator poled to pass the negative portion of the output signal from said second differentiator to said trigger circuit; and said second means including a first normally conductive switch device having its conduction condition controlled by said rectangular pulses;

a source of operating potential;

a first resistor coupling said source of operating potential to said first switch device;

a second resistor coupling said first switch device to a reference potential;

an output terminal coupled to the junction between said first resistor and said first switch device;

a second normally nonconductive switch device having its conduction condition controlled by one output signal of said trigger circuit coupled intermediate said reference potential and the junction between said first switch device and said second resistor;

a third resistor coupled to the junction between said first resistor and said first switch device; and a third normally conductive switch device having its conduction condition controlled by the other output signal of said trigger circuit coupled between said third resistor and said reference potential.

12. A converter to convert a sequence of rectangular pulses into a train of pulses capable of being transmitted on a transmission path impervious to direct current voltage comprising:

a source of rectangular pulses;

a monostable trigger circuit;

first means coupled to said source and the input of said trigger circuit to produce a first pulse time coincident with the leading edge of each of said rectangular pulses;

second means coupled to said source and the input of said trigger circuit to produce a second pulse time coincident with the trailing edge of each of said rectangular pulses;

said first and second pulses controlling the triggering of said trigger circuit; and third means coupled to said source and the output of said trigger circuit to produce said train of pulses, each pulse thereof having four steps of predetermined different voltage values.

13. A converter to convert a sequence of rectangular pulses into a train of pulses capable of being transmitted on a transmission path impervious to direct current voltage comprising:

a source of rectangular pulses;

a monostable trigger circuit;

first means coupled to said source and the input of said trigger circuit responsive to each of the leading and trailing edges of each of said rectangular pulses to produce control pulses to control the triggering of said trigger circuit; and second means coupled to said source and the output of said trigger circuit to produce said train of pulses, each pulse thereof having four steps of predetermined different voltage values.

References Cited by the Examiner

UNITED STATES PATENTS

| | | | |
|---|---|---|---|
| 3,072,851 | 1/1963 | Fairstein et al. | 328—53 |
| 3,195,056 | 7/1965 | Trautwein | 328—165 |

ARTHUR GAUSS, *Primary Examiner*.

S. D. MILLER, *Assistant Examiner*.